June 2, 1959

J. A. DINWIDDIE ET AL 2,889,268

METHOD OF CONVERTING HYDROCARBONS USING
A HEAT STABLE GAMMA ALUMINA

Filed March 6, 1953

INVENTORS.
James A. Dinwiddie,
BY Max A. Mosesman,

ATTORNEY.

2,889,268
METHOD OF CONVERTING HYDROCARBONS USING A HEAT STABLE GAMMA ALUMINA

James A. Dinwiddie and Max A. Mosesman, Baytown, Tex., assignors, by mesne assignments, to Esso Research and Engineering Company, Elizabeth, N.J., a corporation of Delaware Application March 6, 1953, Serial No. 340,894

4 Claims. (Cl. 208—136)

The present invention is directed to a method for producing an improved alumina. More particularly, the invention is directed to producing boehmite. In its more specific aspects, the invention is directed to producing gamma alumina having a high surface area and thermal stability from an aluminum alcoholate.

The invention is also directed to a method for using a catalyst comprising the gamma alumina.

This application is a continuation-in-part of Serial No. 318,213, filed November 1, 1952, in the names of James A. Dinwiddie and Max A. Mosesman and entitled "Preparation of Improved Alumina."

The present invention may be briefly described as involving the reaction of an alcohol having 1 to 10 carbon atoms, such as an aliphatic alcohol, with aluminum metal, such as aluminum turnings, under conditions to cause the formation of an aluminum alcoholate. Such conditions usually will include a temperature in the range from about 75° to about 300° F. After the aluminum alcoholate is formed, it may exist either dissolved in the solution or as a separate solid phase; the reaction product is then exposed to a moisture laden atmosphere, such as air containing moisture, to cause the moisture to come into contact with the aluminum alcoholate. Thus the moisture contacts the aluminum alcoholate and hydrolyzes same to boehmite or, more precisely, alumina alpha monohydrate in accordance with our invention. The moisture contacts the aluminum alcoholate only in quantities sufficient to hydrolyze the aluminum alcoholate to alumina alpha monohydrate rather than to bayerite.

The use of a moisture laden atmosphere provides the means of adding and controlling the concentration of water at the point of hydrolysis, thereby insuring that the hydrolysis occurs with a low concentration of water and with the consequent formation of only boehmite. In contradistinction, the conventional use of high concentrations of water, as, for example, in the addition of liquid water below its boiling point, directs the hydrolysis to the formation of bayerite, which is to be avoided in our invention.

It is postulated that the moisture in the moisture laden atmosphere, since it exists in vaporous form, contacts only that part of the aluminum alcoholate at the interface and hydrolyzes same which is exposed to the moisture. Thus the moisture or water vapor is continually being supplied to the exposed aluminum alcoholate only in quantities sufficient to hydrolyze to boehmite only that portion of the aluminum alcoholate which is exposed to moisture without providing an excess of water.

After the aluminum alcoholate has been completely hydrolyzed to the boehmite, the boehmite is separated from the residual solvent, such as by filtration or decantation, and then subjected to drying at a temperature of about 230° F. Thereafter the boehmite containing largely combined water may be subjected to a heating operation at a temperature in the range from about 600° to about 1600° F. with temperatures in the range from about 600° to 1000° F. preferred to remove combined water and to form gamma alumina. The heating operation at about 1000° F. insures conversion of the boehmite to gamma alumina.

The alcohols finding use in the present invention may include the aliphatic alcohols, such as methyl alcohol, ethyl alcohol, the propyl alcohols, the butyl alcohols, amyl alcohols, hexyl and heptyl alcohols and the higher members of the series having up to about 10 carbon atoms in the molecule. It is preferred to use amyl alcohol and alcohols having from 5 to about 8 carbon atoms in the molecule.

The hydrolysis operation in accordance with the present invention is conducted at atmospheric conditions of temperature and pressure. The aluminum alcoholate is exposed to the atmosphere which usually in the Gulf Coast contains a substantial amount of moisture for a period of time which may range up to 128 hours and may be considerably shorter. For example, desirable results have been obtained at 48 hours and 90 hours of exposure to atmospheric moisture. The time of exposure may be shortened considerably by passing continually a stream such as air saturated with moisture over the bulk of the aluminum alcoholate which may be provided in a closed container such that the alcohol which is weathered off may be recovered. Thus as little as six hours or less contact may satisfactorily cause hydrolysis of the aluminum alcoholate to boehmite.

The invention also involves a method for converting hydrocarbons employing a catalyst comprising gamma alumina derived from boehmite in which a hydrocarbon boiling in the range between 100° and 500° F. is contacted with a catalyst comprising an active catalytic component and gamma alumina derived from boehmite at a temperature in the range from 800° to 1150° F. for a sufficient length of time to convert the hydrocarbon. The conversion operation appreciates the octane number of the hydrocarbon feed to a marked extent.

It is contemplated that the hydrolysis of the aluminum alcoholate may be encompassed by contacting the aluminum alcoholate with water vapor under atmospheric conditions such that the aluminum alcoholate is hydrolyzed to boehmite rather than to bayerite. The latter hydrate is unsuitable in the present invention.

The hydrocarbon finding employment in the method of the present invention may be a hydrocarbon fraction, such as a crude petroleum fraction boiling in the range between 100° and 500° F. The hydrocarbon may suitably be a wider boiling hydrocarbon, such as a gas oil fraction boiling up to 750° F., or it may be a crude residuum having a higher boiling point. For example, a crude residuum may find usage in the catalytic cracking of hydrocarbons employing the catalyst of the present invention.

The hydrocarbon preferably, however, is a hydrocarbon boiling in the lower part of the range, say from 100° to 500° F., and when the catalyst is used for reforming the hydrocarbon to appreciate the octane number of the said hydrocarbon, the fraction may suitably boil from about 200° to about 400° F.

It is desirable that the hydrocarbon be either a paraffinic hydrocarbon, a naphthenic hydrocarbon or an olefinic hydrocarbon. Suitably the hydrocarbon fraction may be a mixture of the several types of hydrocarbons mentioned. It is preferred to use a naphthenic hydrocarbon when the catalyst is used for reforming operations termed in the industry as "hydroforming." The feed stock may be a paraffinic hydrocarbon or a mixture of paraffinic hydrocarbons and naphthenic hydrocarbons with the paraffins undergoing aromatization and the naphthenic hydrocarbons being hydroformed to the corresponding aromatic hydrocarbons. The paraffinic hydrocarbons may separately be aromatized, and the naphthenic hydrocarbons may separately be hydroformed, if desired.

The use of hydrogen is beneficial in the practice of the present invention, and it is desirable to use hydrogen in an amount in the range from 100 to 10,000 standard cubic feet per barrel of feed. An amount of hydrogen in the range from 1500 to 5000 standard cubic feet per barrel of hydrocarbon gives quite satisfactory results.

Temperatures employed may range from about 850° to 1150° F. with temperatures of about 900° to 1000° F. being preferred for reforming operations as that terminology is understood in the industry.

Pressures may suitably range from about 15 to about 500 p.s.i.g. with desirable results being obtained at pressures around 150 to about 300 p.s.i.g. in reforming or hydroforming operations.

The hydrocarbon should be fed, in the method of the present invention, in contact with the catalyst at a space velocity in the range from 0.5 to about 5 volumes of feed per volume of catalyst per hour. In reforming operations, such as aromatization and hydroforming, a space velocity of about 1 volume of feed per volume of catalyst per hour gives very good results.

The invention will be further illustrated by reference to the drawing in which

Figure 1:
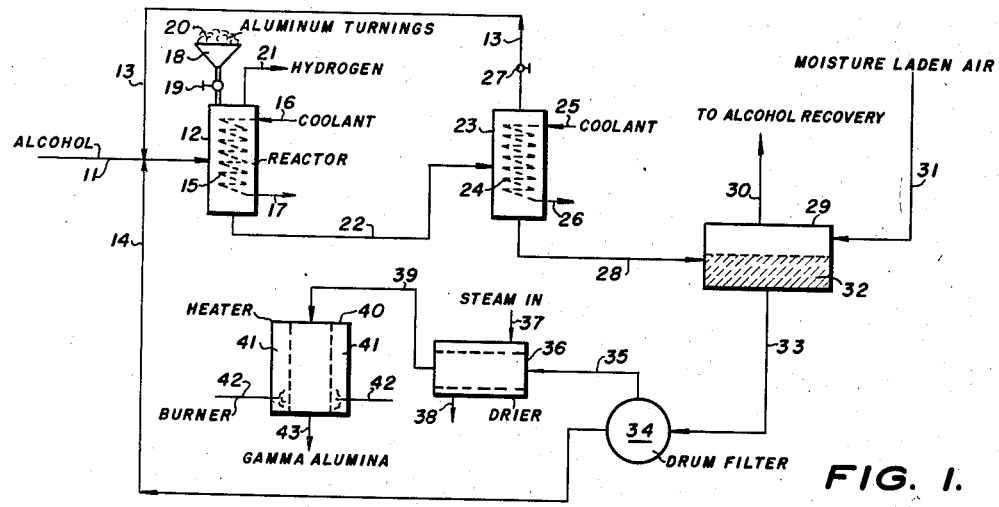
Fig. 1 is a flow diagram of a mode of conducting the invention.

Referring now to the drawing and particularly Fig. 1, numeral 11 designates a charge line through which an aliphatic alcohol, such as amyl alcohol, is introduced into reactor 12. The alcohol may be used alone or in admixture with a solvent such as an aliphatic hydrocarbon, specifically a paraffinic hydrocarbon or a petroleum naphtha. Alcohol from later stages in the process may be introduced into line 11 by lines 13 and 14 as will be described further hereinafter. A catalyst such as a salt of mercury or mercury itself may be added with the alcohol or aluminum to speed up the reaction.

Reactor 12 is provided with a cooling means, such as a cooling coil 15, through which a coolant or refrigerant is circulated by way of inlet 16 and outlet 17.

Reactor 12 is provided also with a hopper 18 which is controlled by a valve 19 which allows the introduction of aluminum turnings 20 into the reactor 12.

The reactor 12 is provided with line 21 for withdrawal of hydrogen liberated by the reaction.

On contact of the aluminum metal 20 with the aliphatic alcohol introduced by line 11 into reactor 12 the aluminum alcoholate is formed therein and hydrogen is liberated and discharged by line 21. The solution containing aluminum alcoholate may then be withdrawn from reactor 12 by line 22 into a vessel 23 which is provided with a cooling means, such as cooling coil 24 through which a suitable coolant or refrigerant is circulated by inlet 25 and outlet 26. Vessel 23 is really a settling vessel which allows separation of supernatant solution from the aluminum alcoholate. This supernatant solution is withdrawn from vessel 23 by line 13 controlled by valve 27 and introduced, as has been described, into line 11. Of course, it is understood that valve 27 may be kept closed and the total solution including the solid phase aluminum alcoholate withdrawn by line 28 into a hydrolysis or weathering vessel 29 wherein the hydrolysis of the aluminum alcoholate to boehmite occurs.

Vessel 29 is provided with line 30 by way of which alcohol saturated air is withdrawn to an alcohol recovery system, not shown. Vessel 29 is also provided with line 31 by way of which moisture laden air is introduced into tank 29 above the body 32 of the aluminum alcoholate represented by the shaded portions. On passage of the moisture laden air over the body 32 of the aluminum alcoholate, hydrolysis occurs, the aluminum alcoholate being converted to boehmite and any alcohol in the body or mass 32 being weathered off and removed by line 30 to an alcohol recovery system, not shown. After the hydrolysis is substantially complete, the boehmite containing uncombined water and alcohol is removed from vessel 29 by line 33 to a separation means, such as a drum filter 34 wherein alcohol is removed from the boehmite and discharged by line 14 into line 11 for reuse in the process. The boehmite is then discharged by line 35 into a drier 36 through which circulates by an inlet line 37 and an outlet line 38 a suitable heating fluid, such a steam, to raise the temperature of the boehmite to about 230° F. to dry it.

The boehmite substantially free of uncombined water discharges from drier 36 by line 39 into a heater 50 which is provided with heating cells 41 equipped with burners or heating means 42 which serve to raise the temperature of the boehmite in the water 40 to a temperature in the range from 600° to 1600° F. to remove combined water therefrom and to convert the boehmite to gamma alumina by removing water of hydration. The gamma alumina is withdrawn from the heater 40 by way of line 43. The gamma alumina may then be suitably used as an adsorption medium or as a catalyst or as a catalyst support.

When the gamma alumina of the present invention is used as a catalyst base or in conjunction with other active catalytic material, the other catalytic material may suitably be added during the processing operation. For example, it may be added to the system before or after the formation of the aluminum alcoholate or after the formation of the boehmite. For example, catalytic materials such as silica, iron, cobalt, nickel, platinum, vanadium, chromium, molybdenum, tungsten and many other catalytic materials too numerous to mention here may suitably be added to the gamma alumina either as such or during the formation of the gamma alumina or the formation of the boehmite. The active metal catalytic component may suitably be in the range from 0.2% to 20% by weight of the composition with the remainder being the gamma alumina of the present invention.

Figure 2:
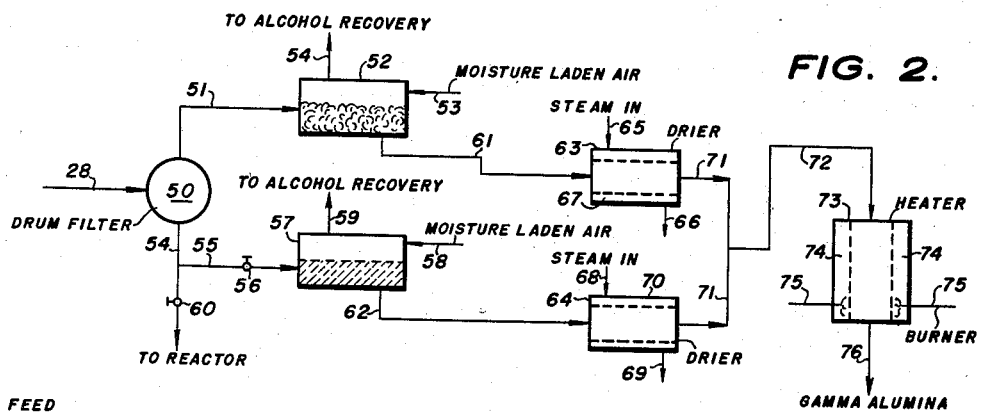
Fig. 2 represents a modification of the mode of Fig. 1.

Referring now to Fig. 2, a modification of our invention is shown wherein the aluminum alcoholate solution or mass from vessel 23 is withdrawn by line 28 into a separation means, such as a drum filter 50, which separates the aluminum alcoholate crystals from the solution. The drum filter may suitably be replaced by other separation means well known to the art. In any event, the solid aluminum alcoholate is withdrawn from drum filter 50 by line 51 into a hydrolysis tank 52 which is similar to tank 29. Hydrolysis tank 52 is provided with line 53 by way of which moisture laden air is introduced and with line 54 for withdrawal of alcohol saturated air from tank 52. The liquid or solution from separation means 50 is withdrawn by line 54 and routed by line 55 controlled by valve 56 into a second tank 57 which is similar to tanks 52 and 29. Tank 57 is provided with an inlet line 58 through which moisture laden air is introduced and line 59 for withdrawal of alcohol saturated air. Under some conditions, it may be desirable to by-pass tank 57, and in these cases valve 56 is closed and valve 60 in line 54 is opened, it being contemplated that line 54 will connect into the equivalent of line 11 in Fig. 1.

The moisture laden air is passed into tanks 52 and 57 through lines 53 and 58, respectively, for a time sufficient to hydrolyze the aluminum alcoholates contained in the respective tanks. Thereafter the boehmite in these tanks is withdrawn by lines 61 and 62 and to drying means 63 and 64. Drying means 63 is provided with a steam inlet 65 and a steam outlet 66 which allows steam to circulate through the jacket 67 and raise the temperature of the boehmite to about 230° F. to remove uncombined water therefrom. Likewise in drier 64 a steam inlet 68 and a steam outlet 69 are provided to allow circulation of steam through jacket 70 to raise the temperature of the boehmite in drier 64 to about 230° F.

The boehmite in driers 63 and 64 is withdrawn therefrom into a manifold 71 which connects by line 72 to a heater 73 provided with burner sections 74, each of which is equipped with burners or heating means 75 to allow the temperature in heater 73 to be raised to a temperature in the range from 600° to 1600° F. This heating operation in heater 73 removes combined water from the boehmite and converts it to gamma alumina. The gamma alumina, after the heating treatment at a temperature in the range from 3 to 48 hours, is removed from heater 73 by line 76 and may be used for purposes mentioned with respect to Fig. 1.

Figure 3:
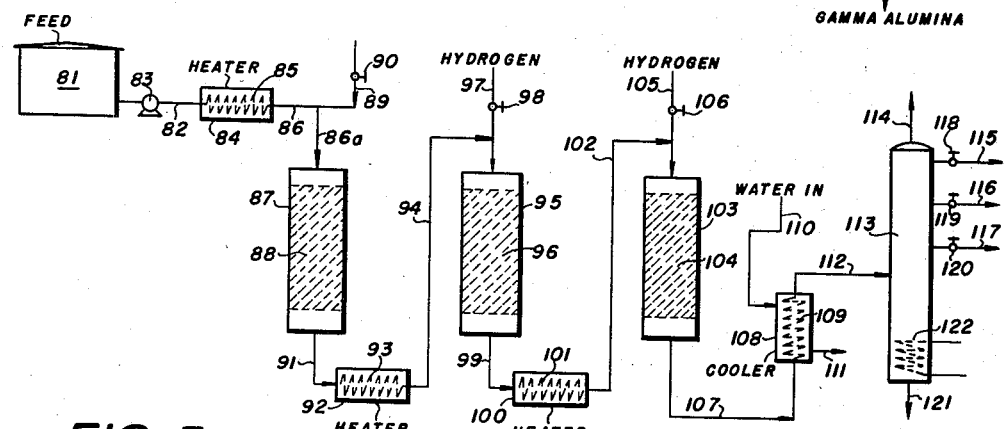
Fig. 3 represents a mode illustrating the use of a catalyst of the present invention.

Referring now to Fig. 3, numeral 81 designates a charge tank which contains a feed hydrocarbon, such as a naphthenic hydrocarbon or a paraffinic hydrocarbon boiling in the range from about 100° to 500° F., and obtained from a source not shown. The feed hydrocarbon is withdrawn from tank 81 by line 82 containing pump 83, which discharges the feed hydrocarbon into a furnace or heater 84 provided with a coil 85 and heated by means not shown. In heater 84 the temperature of the feed hydrocarbon is raised to a temperature of about 975° F., and the heated and vaporized hydrocarbon is then introduced by lines 86 and 86a into a reaction zone 87, which contains a bed 88 of catalyst comprising gamma alumina derived from boehmite as the catalyst support. For example, the bed of catalyst 88 may be molybdenum oxide on gamma alumina derived from boehmite. Suitably a catalyst bed 88 may comprise about 9% molybdenum oxide or molybdena, as it is sometimes called, and 91% by weight of gamma alumina derived from boehmite, as has been described. Provision is made to introduce the hydrocarbon in line 86 an amount of hydrogen through line 89 controlled by valve 90. The reaction in bed 88 is an endothermic reaction which results in a temperature drop as a result of the mixture of hydrogen and hydrocarbon passing into zone 87 from line 86 into line 86a and then into zone 87. As a result, the hydrocarbons in zone 87 are at least partially converted and issue therefrom at a temperature of about 840° F. The converted hydrocarbons are withdrawn from zone 87 by line 91 and are routed into a second heater or furnace 92 containing a coil 93. Heater or furnace 92 is also provided with heating means, not shown, which allows the temperature of the material charged to heater 92 to be raised back up to 975° F., allowing the reheated material to flow by line 94 into reaction zone 95 which, like reaction zone 87, contains a bed 96 of molybdenum oxide on gamma alumina derived from boehmite. Provision may be made if necessary for introducing hydrogen into line 94 by line 97 controlled by valve 98. The hydrocarbons passing through bed 96 are further converted, but since an endothermic reaction also prevails in bed 96, the temperature of the product issuing by line 99 from reaction zone 95 is at a temperature of about 900° F., which requires reheating of the products for further conversion. This is accomplished by passing the converted products into a furnace or heater 100 which contains a heating coil 101 which raises the temperature of the converted products up to 975° F. and allows introduction by line 102 into a third reaction zone 103, which, like reaction zones 95 and 87, contains a bed 104 of molybdenum oxide on gamma alumina derived from boehmite. As will be noted, line 105 controlled by valve 106 ties into line 102 and allows hydrogen, if desired, to be introduced into zone 103. The products issue from zone 103 by line 107 and are routed into a cooler or condenser 108, which contains a coil 109 which reduces the temperature of the converted products to a temperature sufficiently low to terminate the reaction. Water or a suitable cooling fluid is circulated through cooler 108 by lines 110 and 111. The cooled product, which suitably may be at a distillation temperature, is withdrawn from cooler 108 by line 112 and is discharged therefrom into a distillation zone 113, which is understood to include precise fractional distillation equipment. Zone 113 may be a plurality of distillation towers, and it is understood that zone 113 is provided with all auxiliary equipment associated with such distillation equipment which will include means for inducing reflux, condensers and coolers and suitable internal vapor-liquid contacting means, such as bell cap trays, Raschig rings and other packing materials and the like. Zone 113 may also include flash vaporization equipment if desired.

For the purpose of this description, zone 113 is illustrated as a single distillation tower provided with line 114 for withdrawing as an overhead fraction all gases and uncondensibles and with lines 115, 116 and 117 controlled respectively by valves 118, 119 and 120 for withdrawal of the desired products. It is contemplated that the off gases from zone 113 may be employed as a recycle gas stream in lieu of fresh hydrogen wherever employed in our process. A bottoms line 121 is also provided for removal of heavy ends. Distillation zone 113 has a heating means such as a steam coil 122 for adjustments of temperatures and pressures.

Thus in the mode of our invention as illustrated in Fig. 3, it is possible to obtain beneficial results employing the improved catalyst.

It is contemplated in the practice of our invention that the reaction zones 87, 95 and 103 may be replaced by reaction zones in which the fluidized powdered technique is employed. In other words, in such systems the hydrocarbons which are to be converted are vaporized, and the catalyst in a powdered form is suspended in the vaporized hydrocarbons. Such fluidized powdered techniques are well known.

When a fluidized powdered technique is employed, the catalyst should have a suitable particle diameter size to allow suspension of the catalyst in the vaporized hydrocarbon. Catalysts with particle diameters in the range from 0 to 100 microns with the major portion of the particles having diameters in the range from 20 to 80 microns are susceptible to fluidization. It is contemplated, therefore, that the catalyst comprising a catalytic component and gamma alumina derived from boehmite may be adjusted to provide the proper particle diameter for fluidization in converting hydrocarbons.

The invention will be illustrated by the following examples:

EXAMPLE I 100 grams of aluminum metal turnings were dissolved in a mixture of 1500 ml. of isopropyl alcohol and 500 ml. of n-heptane in the presence of 5 grams of mercuric chloride as a catalyst. After approximately 40 hours of refluxing, the dissolution was complete. The resulting reaction mixture was allowed to stand in a closed flask for about 90 hours, after which the supernatant liquid was then rapidly decanted, leaving behind a large quantity of well-defined tetrahedral crystals with a side length of about 1/8″. Upon weathering under atmospheric conditions, these crystals lost their crystalline form, disintegrating into a fine powder. X-ray diffraction patterns obtained on the powder showed the material to be essentially amorphous to X-rays; moreover, the amorphous character persisted after heat treatments of 3 hours at both 1000° F. and 1250° F. The typical pattern of amorphous gamma alumina (broad but distinct diffraction lines) was observed after heating for 4 hours at 1550° F. The excellent thermal stability of this alumina is also reflected in the specific surface values obtained on the heated samples; 265 m.$^2$/gram after 3 hours at 1000° F. and 177 m.$^2$/gram after 4 hours at 1550° F.

EXAMPLE II

In view of the beneficial results obtained in forming gamma alumina as in Example I, additional runs were made as follows:

150 grams of aluminum metal turnings were dissolved in a mixture of 750 ml. of n-heptane and 2250 ml. of isopropyl alcohol in the presence of approximately 8 ml. of mercury as a catalyst. The resultant mixture was allowed to stand for about two weeks after completion of the reaction to permit the formation of the largest possible amount of the tetrahedral crystals. The supernatant solution was then decanted into 3 liters of water with vigorous mixing in order to obtain hydrolysis of the aluminum alcoholate. After weathering for about 48 hours, the slurry was filtered; the precipitate was then water washed and subsequently partially dried at 230° F. A total of 210 grams of product (27% water) was obtained from two such preparations carried out in parallel; this combined product was designated 5S.

The tetrahedral crystals remaining from the above decantation disintegrated into a fine white powder after weathering for two days. The resulting powder was water washed and subsequently partially dried at 230° F. A yield of 600 grams (36% water) of this product, designated as 5C, was obtained from the abovementioned parallel preparations.

Preparations 4S and 4C were prepared by essentially the same procedure as that described above with the following exceptions: (1) approximately 3 grams of mercuric chloride was employed as a catalyst in the dissolution step in addition to the mercury used in preparations 5S and 5C; (2) both 4S and 4C were washed with alcohol prior to water washing in order to reduce the contamination of the finished materials by mercuric chloride. The efficacy of this washing procedure is reflected in the chloride content of preparation 4C; namely, 0.034%.

In order to establish the thermal stability characteristics of the foregoing preparations, X-ray diffraction patterns were obtained on the materials dried at 230° F. and on samples of these dried materials after heat treatments of 3 hours at 1250° F., 1400° F., and 1550° F., respectively. The results of the X-ray analyses are summarized as follows:

(1) Drying at 230° F. produces gamma-$Al_2O_3 \cdot H_2O$ (boehmite) in the case of the "C" preparations, alpha-$Al_2O_3 \cdot 3H_2O$ (bayerite) in the case of the "S" preparations.

(2) All the elevated heat treatments indicated above produced amorphous gamma-$Al_2O_3$ for both "C" and "S" preparations.

(3) In each case, the diffraction pattern of the "C" preparation showed greater amorphism than that of the corresponding "S" preparation.

(4) Although each elevated heat treatment produced gamma-$Al_2O_3$, the diffraction lines of which became increasingly sharper with increase of temperature, the breadths of the reflections for the "C" preparations heated at 1550° F. were approximately equivalent to those of the initial preparation that showed no pattern at the heat treatment temperatures employed below 1550° F.

EXAMPLE III

Since the X-ray diffraction data confirmed the admirable thermal characteristics of the gamma alumina, it became desirable to determine the suitability of the gamma alumina as a catalyst base. For this specific purpose, catalysts comprising 9% $MoO_3$ and 91% of each of the above aluminas were prepared by wet mulling calculated quantities of the subject materials (the 5S and 5C preparations were mulled for 20 hours, the 4C preparation for only 20 minutes); drying at 230° F. for 20 hours in a mechanical convection oven; and activating by heat treatment under a nitrogen atmosphere in an electric muffle furnace according to the following schedule; (1) an increase in temperature to 100° F. maintained for 15 minutes, (2) subsequent increases in temperature at the rate of 100° F./15 minutes to 1000° F., (3) maintenance of a temperature of 1000° F., for 4 hours. The activated preparations were then transferred immediately from the muffle furnace to a 230° F. mechanical convection oven for cooling. After reaching this temperature, the materials while still hot, were formed into 3/16" tablets to yield the finished catalysts. In addition to the normal activation treatment, samples of the finished catalysts were subjected to an accelerated aging test (in which samples are heated in a muffle furnace in air for 24 hours at 1450° F.). X-ray diffraction patterns and specific surface measurements were then obtained on each of the fresh catalysts and on the heat-treated samples. The respective diffraction patterns were then microphotometered and the line breadth of the strongest gamma-$Al_2O_3$ reflection (1.396 A.) at half intensity measured in order to provide a relative measure of crystal size. The results of these measurements and those of specific surface are presented in Table I; for comparative purposes, similar data on a commercial catalyst are also included.

*Table 1*

STABILITY CHARACTERISTICS OF $MoO_3$ ON GAMMA-$Al_2O_3$ CATALYSTS

| Catalyst No. | $Al_2O_3$ Base | Line Breadth at Half Intensity, mm. | | Specific Surface, M.²/Gm. | | Surface Loss, Percent |
|---|---|---|---|---|---|---|
| | | Fresh | After 24 Hrs. at 1,450° F. | Fresh | After 24 Hrs. at 1,450° F. | |
| 1791 | 5C | 11.0 | 6.5 | 285 | 165 | 42 |
| 1792 | 5S | 7.5 | 5.0 | 339 | 109 | 68 |
| 1795 | 4C | 11.0 | 8.5 | 328 | 169 | 48 |
| Commercial | | 7.0 | 6.0 | 116 | 99 | 15 |

The data contained in Table I are informative from several standpoints. The greater stability toward thermal surface degradation of the "C" alumina-based catalysts with respect to the "S" alumina-based catalysts is readily apparent from both the line breadth and specific surface measurements. Although the specific surface of the former is less than that of the latter in the case of the fresh catalysts, the resistance to loss of surface exhibited by the "C" preparations indicates that for the preparation of pure alumina-based catalysts by means of the aluminum isopropoxide procedure a decided improvement accrues to the use of the "C" material. This advantage becomes more apparent since the correlations developed from our accelerated aging test indicated that the activity maintenance characteristics of an active $$MoO_3—Al_2O_3$$

catalyst are reflected in the degree of surface area degradation experienced during the test. In this connection, although the commercial catalyst shows a lower loss in surface in the accelerated aging test, it is likely that the greater amorphism and final level of surface area in the case of the "C" alumina-based catalysts will adequately compensate for their observed greater surface area loss.

The catalysts described in Examples II and III were then employed in a hydroforming operation in comparison with a commercially available catalyst. In hydroforming a virgin naphtha boiling in the range from 200° to 300° F., this naphtha was charged to a isothermal unit at a space velocity of one volume of feed per volume of catalyst per hour at a temperature of 950° F. employing 2500 standard cubic feet of hydrogen per barrel of feed with a reactor pressure of 215 p.s.i.g. This was a fixed bed unit operation, and 4-hour reaction periods were employed. The results of these runs are shown in Table II in comparison with the commercial catalyst.

Table II

| Catalyst | C₅+ Hydroformate | | C₄+ Hydroformate | | 10 Gasoline | | Aromatic, Yld, Vol. Percent Feed | Carbon, Yld, Wt. Percent Feed |
|---|---|---|---|---|---|---|---|---|
| | Yld., Vol. Percent Feed | O.N., Res. Clr. | Yld., Vol. Percent Feed | O.N., Res. Clear | Yld., Vol. Percent Feed | O.N., Res. Clear | | |
| Commercial I | 79.3 | 92.0 | 92.4 | 88.5 | 97.7 | 92.5 | ¹ 46 | ¹ 0.3 |
| 1791 | 79.3 | 95.6 | 92.4 | 95.5 | 97.7 | 95.2 | 51.5 | 0.2 |
| Commercial I | 76.6 | 93.5 | 91.1 | 91.5 | 94.8 | 95.0 | ¹ 48 | 0.3 |
| 1791 | 76.6 | 98.5 | 91.1 | 98.2 | 94.8 | 97.8 | 55.9 | 0.2 |
| Commercial I | 76.2 | 94.0 | | | | | ¹ 48 | 0.4 |
| 1795 | 76.2 | 98.3 | | | | | 54.3 | 0.1 |

¹ At equivalent C₅+ yield.

It will be apparent from these data that the 1791 and 1795 catalysts identified in Examples II and III mentioned before which were the molybdenum oxide on gamma alumina derived from boehmite gave results superior to the results obtained with the commercial catalyst. Thus with our catalyst and mode of operation a higher octane number product was obtained over the commercial catalyst. The yields of aromatics were also substantially greater and the carbon deposited on the catalyst was slightly less using our improved catalyst over using the commercially available catalysts.

The invention is further illustrated by other runs in which the same catalysts were compared with the commercially available catalysts illustrated in Table III and with another commercially available catalyst which, for purposes of differentiation, is shown as commercial catalyst II. In these particular runs, the feed stocks were normal heptane and aromatization conditions including a space velocity of 1.1 volumes of feed per volume of catalyst per hour, 50 p.s.i.g. 1000° F. and a hydrogen to feed ratio of 2:1 were used. The operation was in a fixed bed with a 3-hour reaction period. The results of these runs are presented in Table III:

Table III

| Catalyst | 1791 | 1795 | Commercial I | Commercial II |
|---|---|---|---|---|
| Yield based on Feed: | | | | |
| Aromatics, Vol. Percent | 31.1 | 20.2 | 20.4 | 27.9 |
| Liquid, Vol. Percent | 60.8 | 65.7 | 60.1 | |
| Carbon, Wt. Percent | 1.0 | 1.4 | 1.6 | 1.7 |
| Conversion, Percent | 75 | 60 | 66 | 63 |
| Selectivities, Wt. Percent: | | | | |
| To Aromatics | 53 | 42 | 39 | 56 |
| To Olefins | 5 | 8 | 8 | 11 |
| To Gas | 41 | 48 | 51 | 31 |
| To Carbon | 1 | 2 | 2 | 3 |

It will be seen from an inspection of the data in Table III that our improved catalyst and mode of using same give results at least comparative in aromatic yield with the commercial I catalyst and exceeding both the commercial I and commercial II with our catalyst preparation 1791. It is noteworthy that improved conversions were obtained with 1791 catalyst over the commercial I and commrecial II catalysts. In all instances our catalyst compared favorably with the commercially available catalysts in aromatization and exceeded the commercial I catalyst in hydroforming the feed stock illustrated before.

In order to illustrate the invention further, aluminum alcoholates were produced from ethyl, isopropyl and normal amyl alcohols. The aluminum alcoholates were then hydrolyzed in accordance with the present invention, dried, and then subjected to heating at various temperatures prior to determining the specific surface of the gamma alumina resulting therefrom. The source of the gamma alumina, the heat treatment and the results of the determination of the specific surface are given in the following table:

Table IV

| Heat Treatment | 1 Hr. at 600 °F. in Vacuo | 3 Hrs. at 1250° F., m.²/g. | 3 Hrs. at 1,400° F., m.²/g. | 3 Hrs. at 1,550° F., m.²/g. |
|---|---|---|---|---|
| γ-Al₂O₃ Source: | | | | |
| Al+C₂H₅OH | 197 | 197 | 141 | 128 |
| Al+i-C₃H₇OH | | ¹ 265 | | ² 177 |
| Al+n-C₅H₁₁OH | 623 | 311 | 242 | 232 |
| Al+n-C₈H₁₇OH | 557 | 377 | 374 | 265 |

¹ 3 hrs. at 1,000° F.
² 4 hrs. at 1,550° F.

The specific surface data show two trends of interest: (1) with the exception of the 600° F. data, at each temperature, an increase in specific surface with increasing molecular weight of the alcohol used in the preparation, and (2) a decrease in specific surface with increasing temperature of heat treatment.

From these data it may be concluded that the higher alcohols are preferable in the formation of aluminum alcoholate and that the lower temperatures in the range given are more desirable from the standpoint of obtaining the highest surface area in the gamma alumina formed.

Since hydrocarbons have been employed in the preparation of the aluminum alcoholate, the following run was made to determine whether the presence of hydrocarbons was required for the formation and whether its presence exerted any effects on the thermal stability characteristics of the final gamma alumina:

Approximately 4 gallons of aluminum alcoholate made with mixed C₅ saturated alcohols in the absence of hydrocarbons were subjected to atmospheric hydrolysis over a period of about 140 hours and the product dried at 230° F. X-ray diffraction examination of this product showed only the presence of boehmite (γ-Al₂O₃.H₂O). Specific surface measurements on samples of the dried product after evacuation for 1 hour at 600° F. and after heating for 3 hours in air at 1550° F. gave values of 732 and 248 m.²/gm., respectively; identical heat treatments on boehmite prepared from n-C₅H₁₁OH in the presence of n-heptane resulted in specific surface values of 623 and 232 m.²/gm., respectively. In all four instances, X-ray diffraction revealed the heated materials to be γ-Al₂O₃. It is thus apparent that the presence of hydrocarbon in the alcoholate process is unimportant from the standpoint of affecting the thermal stability of the product γ-Al₂O₃, although its presence as a diluent may have certain advantages from a process point of view.

Although the molybdenum oxide or molybdena may be added as has been described to the gamma alumina derived from boehmite, it is contemplated that the molybdenum oxide may be formed from ammonium molybdate followed by the usual drying and activating treatments which have been described.

The nature and object of the present invention having been completely described and illustrated, what we wish to claim as new and useful and to secure by Letters Patent is:

1. A method for converting hydrocarbons which comprises contacting a convertible hydrocarbon boiling within the range between 100° and 750° F. with a catalyst consisting of an active catalytic component and heat stable gamma alumina, said heat stable gamma alumina being obtained by reacting aluminum with an aliphatic alcohol under conditions to form an aluminum alcoholate, contacting said aluminum alcoholate with water vapor at atmospheric conditions for a time in the range from 6 to 128 hours to hydrolyze said alcoholate to alumina alpha monohydrate and heating said alumina alpha monohydrate at a temperature in the range of 600° to 1600° F. to form said gamma alumina, at a temperature in the range between 850° and 1150° F. for a sufficient length of time to convert said hydrocarbon to a product of higher octane number than the product obtainable with a similar catalyst under the same conditions.

2. A method in accordance with claim 1 in which the active catalytic component is an oxide of molybdenum.

3. A method for converting hydrocarbons which comprises contacting a hydrocarbon boiling in the range between 100° and 750° F. with a catalyst consisting of an active catalytic component and heat stable gamma alumina, said heat stable gamma alumina being obtained by reacting aluminum with an aliphatic alcohol under conditions to form an aluminum alcoholate, contacting said aluminum alcoholate with water vapor at atmospheric conditions for a time in the range from 6 to 128 hours to hydrolyze said alcoholate to alumina alpha monohydrate and heating said alumina alpha monohydrate at a temperature in the range of 600° to 1600° F. to form said gamma alumina, at a temperature in the range between 850° and 1150° F. for a sufficient length of time and in the presence of hydrogen to convert said hydrocarbon to a product of higher octane number than the product obtainable with a similar catalyst under the same conditions.

4. A method for converting hydrocarbons which comprises contacting a feed hydrocarbon boiling in the range between 100° and 500° F. with a catalyst consisting of molybdena on heat stable gamma alumina, said heat stable gamma alumina being obtained by reacting aluminum with an aliphatic alcohol having 1 to 10 carbon atoms in the molecule to form an aluminum alcoholate, contacting the aluminum alcoholate with water vapor under atmospheric conditions for a time in the range from 6 to 128 hours to hydrolyze said alcoholate to alumina alpha monohydrate and heating said alumina alpha monohydrate at a temperature in the range of 600° to 1600° F. to form said gamma alumina, at a temperature in the range between 850° and 1150° F. at a space velocity in the range from 0.5 to 5.0 volumes of feed per volume of catalyst per hour at a pressure in the range from about 15 to about 500 pounds per square inch gauge and in the presence of hydrogen in an amount in the range from about 100 to 10,000 standard cubic feet per barrel of said hydrocarbon to convert said hydrocarbon to a product of higher octane number than the feed hydrocarbon and the product obtainable with a similar catalyst under the same conditions.

References Cited in the file of this patent

UNITED STATES PATENTS

| | | |
|---|---|---|
| 2,422,372 | Smith et al. | June 17, 1947 |
| 2,500,146 | Fleck et al. | Mar. 14, 1950 |
| 2,636,865 | Kimberlin | Apr. 28, 1953 |
| 2,749,216 | Dinwiddie et al. | June 5, 1956 |

FOREIGN PATENTS

| | | |
|---|---|---|
| 667,145 | Great Britain | Feb. 27, 1952 |